United States Patent
Yu et al.

(10) Patent No.: US 7,329,018 B2
(45) Date of Patent: Feb. 12, 2008

(54) ILLUMINATED HUMAN-MACHINE INTERFACE DEVICE

(75) Inventors: Ching-Chiang Yu, Taipei (TW); Chih Wen Su, Taipei (TW)

(73) Assignee: Behavior Tech Computer Corp., Taipei (TW)

(*) Notice: Subject to any disclaimer, the term of this patent is extended or adjusted under 35 U.S.C. 154(b) by 15 days.

(21) Appl. No.: 10/775,991

(22) Filed: Feb. 9, 2004

(65) Prior Publication Data

US 2005/0057916 A1 Mar. 17, 2005

(30) Foreign Application Priority Data

Sep. 17, 2003 (TW) .............................. 92216644 U (51) Int. Cl.
*F21V 33/00* (2006.01)
(52) U.S. Cl. .................... 362/84; 362/85; 200/313; 200/314
(58) Field of Classification Search ................ 362/84, 362/85, 253; 200/311, 313, 314
See application file for complete search history.

(56) References Cited

U.S. PATENT DOCUMENTS

| | | | |
|---|---|---|---|
| 5,793,358 A * | 8/1998 | Petkovic et al. ............ 345/168 |
| 6,648,530 B2 * | 11/2003 | Kamei et al. ............... 400/472 |
| 6,658,773 B2 * | 12/2003 | Rohne et al. ................. 40/542 |
| 6,773,128 B2 * | 8/2004 | Katrinecz et al. ............. 362/84 |
| 6,917,005 B2 * | 7/2005 | Sasaki ......................... 200/314 |
| 7,090,368 B2 * | 8/2006 | Oross et al. .................. 362/84 |
| 2003/0202339 A1 * | 10/2003 | Oross et al. .................. 362/33 |

* cited by examiner

Primary Examiner—Thomas M. Sember
(74) Attorney, Agent, or Firm—Rosenberg, Klein & Lee (57) ABSTRACT

An illuminated human-machine interface device does not need prepare electric energy by itself to supply power for a light source and can operate by taking advantage of the brightness of a screen of a monitor without any extraordinary illuminating equipment. It can be a keyboard and the positions on which the fluorescent light emits from the keyboard can be chosen on plural key caps. Secondly, it can be a keyboard and the position on which the fluorescent light emits from the keyboard can be chosen on an upper cover. The printed symbols on the key caps and the upper cover can both be formed by positive or negative plate printing with fluorescent ink, or the key caps and the upper cover can both be mixed with fluorescent material therein. Thirdly, it can be a keyboard with a fluorescent plate thereon to emit fluorescent light to make the keyboard a fluorescent keyboard. Fourthly, it can be a mouse having a housing with fluorescent material therein.

8 Claims, 8 Drawing Sheets

ILLUMINATED HUMAN-MACHINE INTERFACE DEVICE

FIELD OF THE INVENTION

The present invention is related to a human-machine interface device, and especially to a human-machine interface device without preparing electric energy by itself to supply power for a light source, and it can operate by taking advantage of the brightness of a screen of a monitor without an extraordinary illuminating equipment, the human-machine interface device can be a keyboard or a mouse.

BACKGROUND OF THE INVENTION

In prior arts, a U.S. patent publish No. 2,003,103,359 titled "ILLUMINATED KEYBOARD" using a backlight device for supplying light source, a U.S. Pat. No. 6,217,183B1 titled "KEYBOARD HAVING ILLUMINATED KEYS" using light emitting members such as LED's or LCD's for supplying light source. These prior arts inevitably use electric energy to afford electric power required for emitting light of the backlight device or the light emitting members; only under the condition that electric energy can keep on supplying, the backlight device or the light emitting members can work, and the keyboard can be operated in a darker environment only having weak light. If power supplying get lost, such light emitting keyboards having the backlight device or the light emitting members will be totally unable to operate under a darker environment only having weak light. And more, for those consumers getting severe and severe in requesting environmental protection, electronic devices are given with a requesting to satisfy the requirement of saving energy under the specification of industrial safety, the above stated conventional keyboards having the backlight device or the light emitting members evidently are contrary to the tendency of environmental protection.

In view of the above defects to be solved pressingly of the prior arts, the inventor of the present invention provides a human-machine interface device completely without the need of a backlight device, and it can operate by taking advantage of the brightness of a screen of a monitor without an extraordinary illuminating equipment, the human-machine interface device of the present invention can be a keyboard or a mouse.

SUMMARY OF THE INVENTION

The primary object of the present invention is to provide a human-machine interface device without the need of preparing electric energy by itself to supply power; the human-machine interface device can operate by taking advantage of the brightness of a screen of a monitor without any extraordinary illuminating equipment.

Therefore, in order to get the abovementioned object, the present invention provides an illuminated human-machine interface device, wherein the illuminated human-machine interface device is a keyboard, and includes a plurality of key caps having therein fluorescent material, the fluorescent material is used to make the printed symbols on the caps recognizable under a weak light source.

Moreover, in order to get the abovementioned object, the present invention provides an illuminated human-machine interface device, wherein the illuminated human-machine interface device is a keyboard; it includes an upper cover having therein fluorescent material, which fluorescent material is used to make the printed symbols on the upper cover recognizable under a weak light source.

Further, in order to get the abovementioned object, the present invention provides an illuminated human-machine interface device, wherein the illuminated human-machine interface device is a keyboard; it includes an upper cover with a plurality of hole regions for keys and includes a fluorescent plate, wherein the fluorescent plate has thereon a plurality of hole regions in corresponding by position respectively to the hole regions for keys, and the fluorescent plate is placed on the upper cover.

And further, in order to get the abovementioned object, the present invention provides an illuminated human-machine interface device, wherein the illuminated human-machine interface device is a mouse; it includes a housing having fluorescent material therein.

The present invention will be apparent in its objects, features and functions after reading the detailed description of the preferred embodiment thereof in reference to the accompanying drawings.

DETAILED DESCRIPTION OF THE INVENTION

Figure 1A:
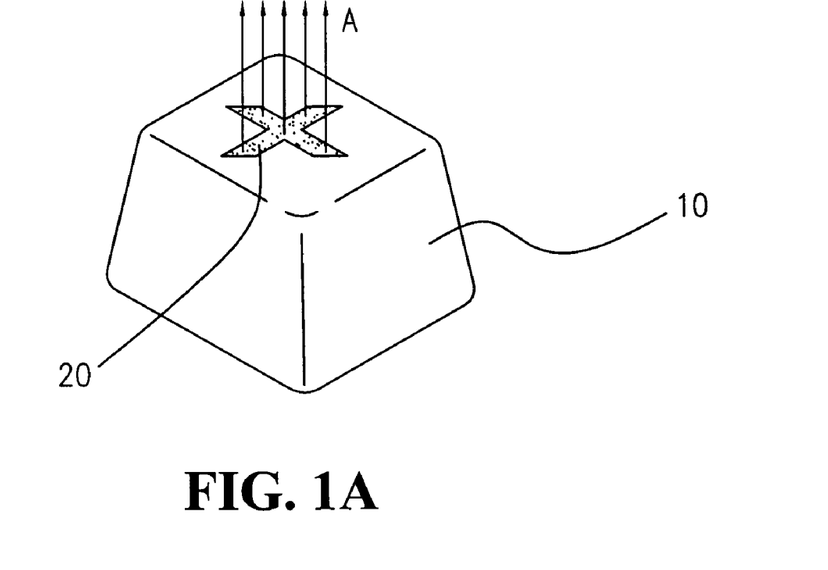
FIGS. 1A-1C are perspective views of key caps having fluorescent material therein of the present invention.
Figure 1B:
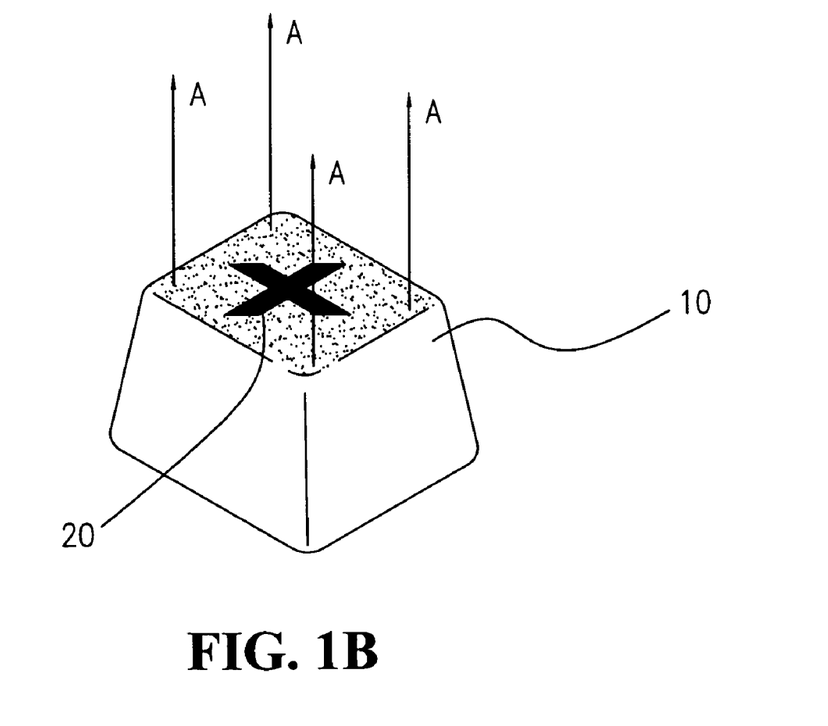
Figure 1C:
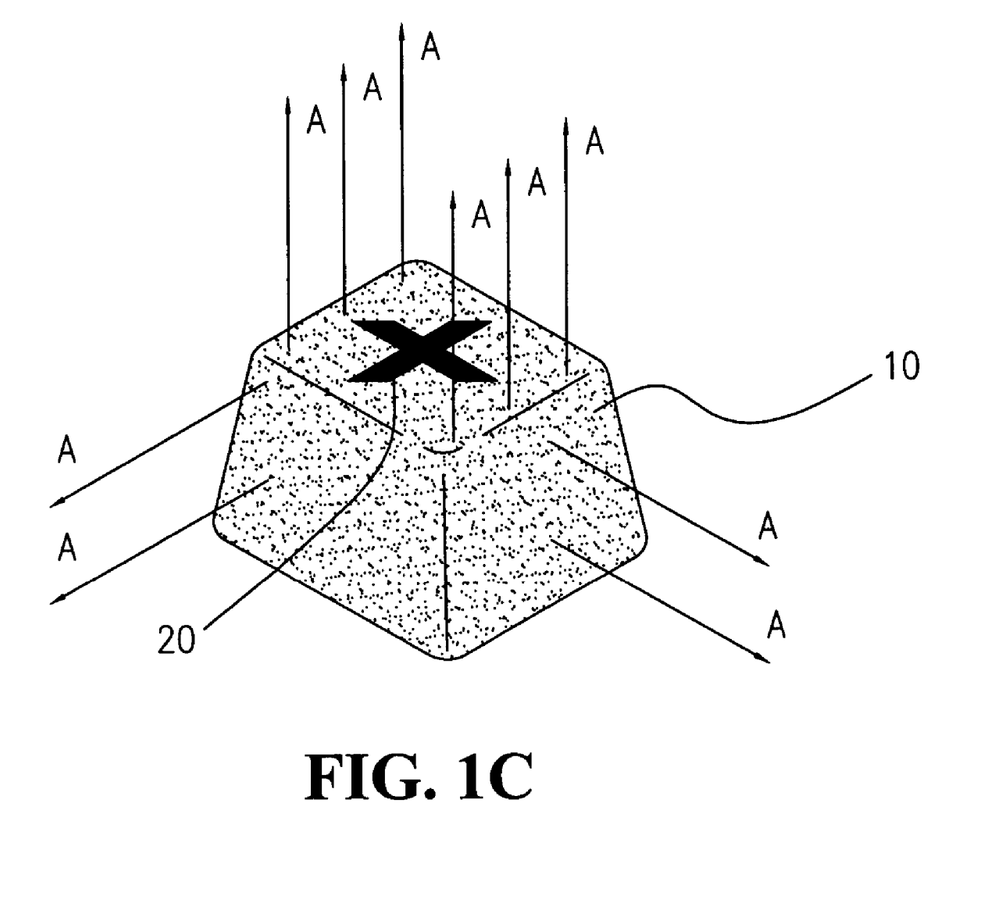

The embodiments of the illuminated human-machine interface device of the present invention can be keyboards or mice; the followings disclose a detailed specification about a first embodiment of the present invention. The first embodiment of the present invention is an illuminated keyboard, the positions on which the fluorescent light emits from the keyboard can be chosen on plural key caps 10, referring to FIG. 1A-1C showing embodiments of key caps having fluorescent material therein of the present invention. The key cap 10 depicted in FIG. 1A is directly printed thereon with a printed symbol 20 by positive plate printing with fluorescent ink; for example, directly printed thereon with an English letter "X" as the printed symbol 20. Thereby the printed symbol 20 on the key cap 10 can emit fluorescent light A by taking advantage of the brightness of a screen of a monitor without any extraordinary illuminating equipment. Moreover, in another printing mode for the printed symbol 20 of FIG. 1A, normal ink (without fluorescent material therein) is used to do positive plate printing in the first place, then transparent fluorescent ink is used to do a second time positive plate printing. The key cap 10 shown in FIG. 1B is printed directly with the printed symbol 20 by negative plate printing using fluorescent ink, such as directly printed with the English letter "X" as the printed symbol 20 by the negative plate printing. Thereby the periphery of the printed symbol 20 on the key cap 10 can emit fluorescent light A by taking advantage of the brightness of a screen of a monitor without any extraordinary illuminating equipment to allow operation of the keyboard propitiously. And in another printing mode for the printed symbol 20 of FIG. 1B, normal ink (without fluorescent material therein) is used to do negative plate printing in the first place, then transparent fluorescent ink is used to do a second time negative plate printing. The key cap 10 shown in FIG. 1C is made of transparent plastic mixed with fluorescent material therein, hence in the same environment as above, the entire key cap 10 can emit fluorescent light A to make outstanding of the printed symbol 20 on the key cap 10.

Figure 2A:
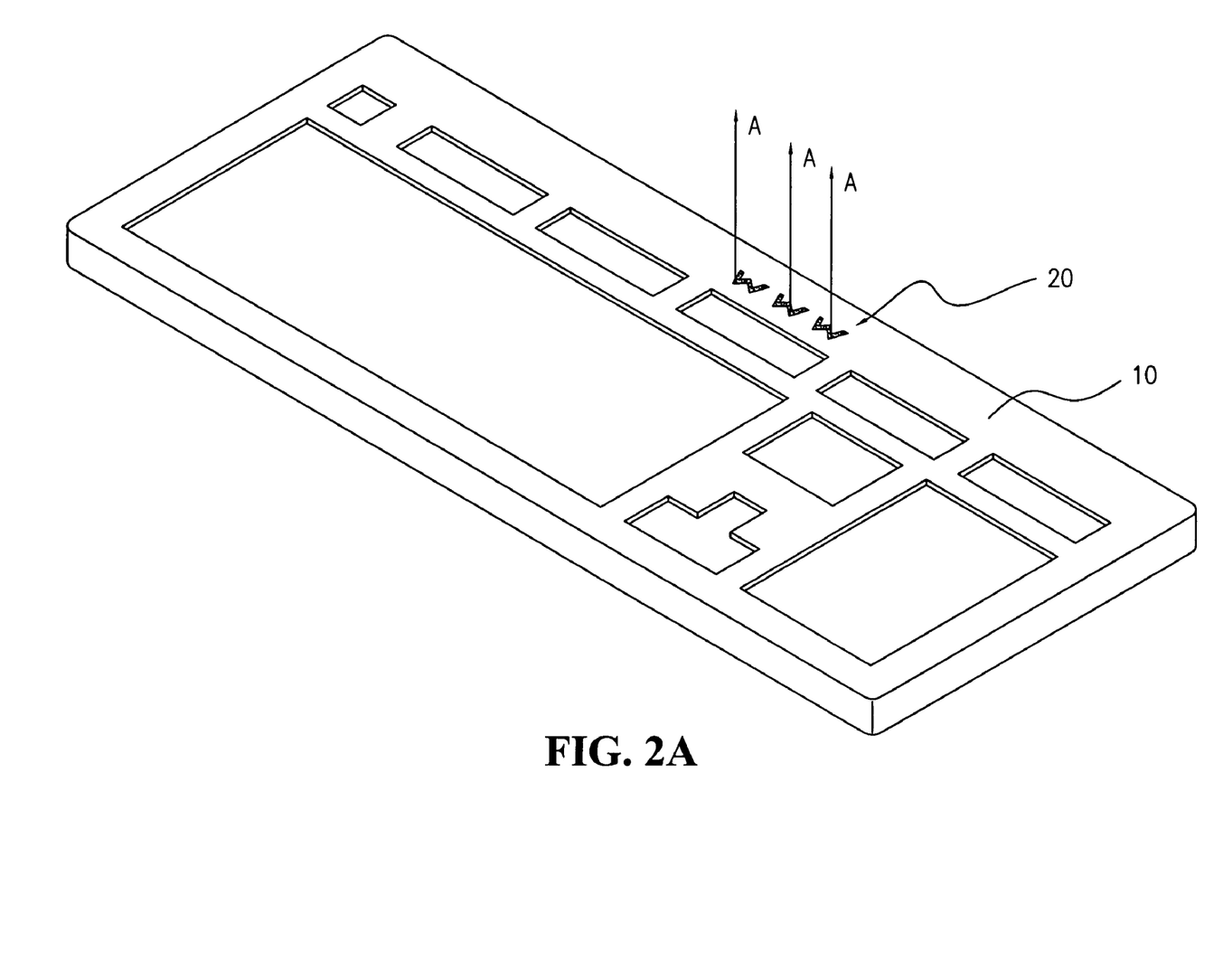
FIGS. 2A-2C are perspective views of embodiments of upper covers having fluorescent material therein of the present invention.
Figure 2B:
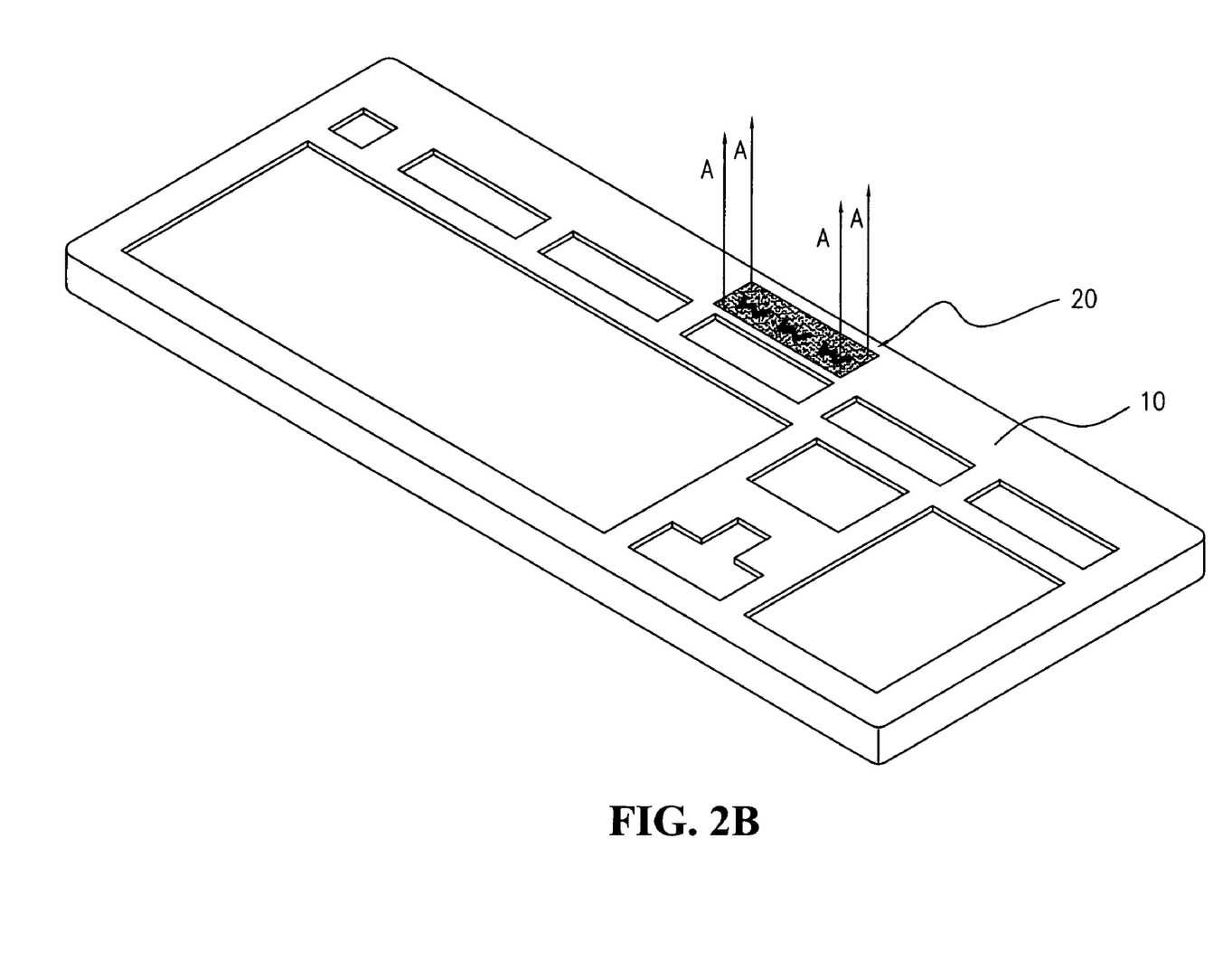
Figure 2C:
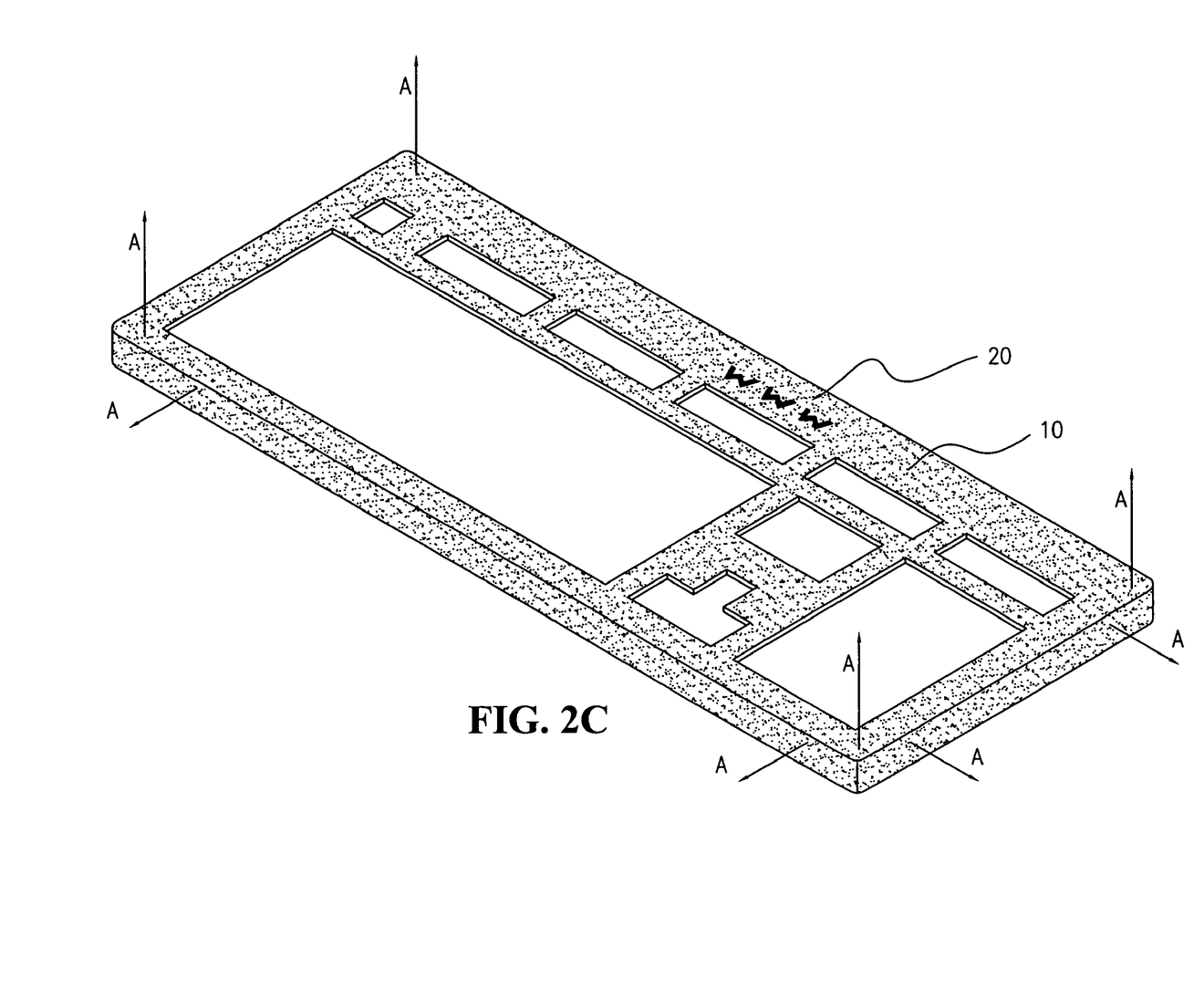

The second embodiment of the present invention is an illuminated keyboard, the position on which the fluorescent light emits from the keyboard can be chosen on an upper cover 30, referring also to FIG. 2A-2C which show embodiments of upper covers 30 having fluorescent material therein of the present invention. The upper cover 30 depicted in FIG. 2A is directly printed thereon with a printed symbol 20 by positive plate printing with fluorescent ink; for example, directly printed thereon with the English letters "WWW" as the printed symbol 20. Thereby the printed symbol 20 on the upper cover 30 can emit fluorescent light A by taking advantage of the brightness of a screen of a monitor without any extraordinary illuminating equipment. Moreover, in another printing mode for the printed symbol 20 of FIG. 2A, normal ink is used to do positive plate printing in the first place, then transparent fluorescent ink is used to do a second time positive plate printing. The upper cover 30 shown in FIG. 2B is printed directly with the printed symbol 20 by negative plate printing using fluorescent ink, such as directly printed with the English letters "WWW" as the printed symbol 20 by the negative plate printing. Thereby the periphery of the printed symbol 20 on the upper cover 30 can emit fluorescent light A by taking advantage of the brightness of a screen of a monitor without any extraordinary illuminating equipment to allow operation of the keyboard propitiously. And in another printing mode for the printed symbol 20 of FIG. 2B, normal ink is used to do negative plate printing in the first place, then transparent fluorescent ink is used to do a second time negative plate printing. The upper cover 30 shown in FIG. 2C is made of transparent plastic mixed with fluorescent material therein, hence in the same environment as above, the entire upper cover 30 can emit fluorescent light A to make outstanding of the printed symbol 20 on the upper cover 30.

Figure 3A:
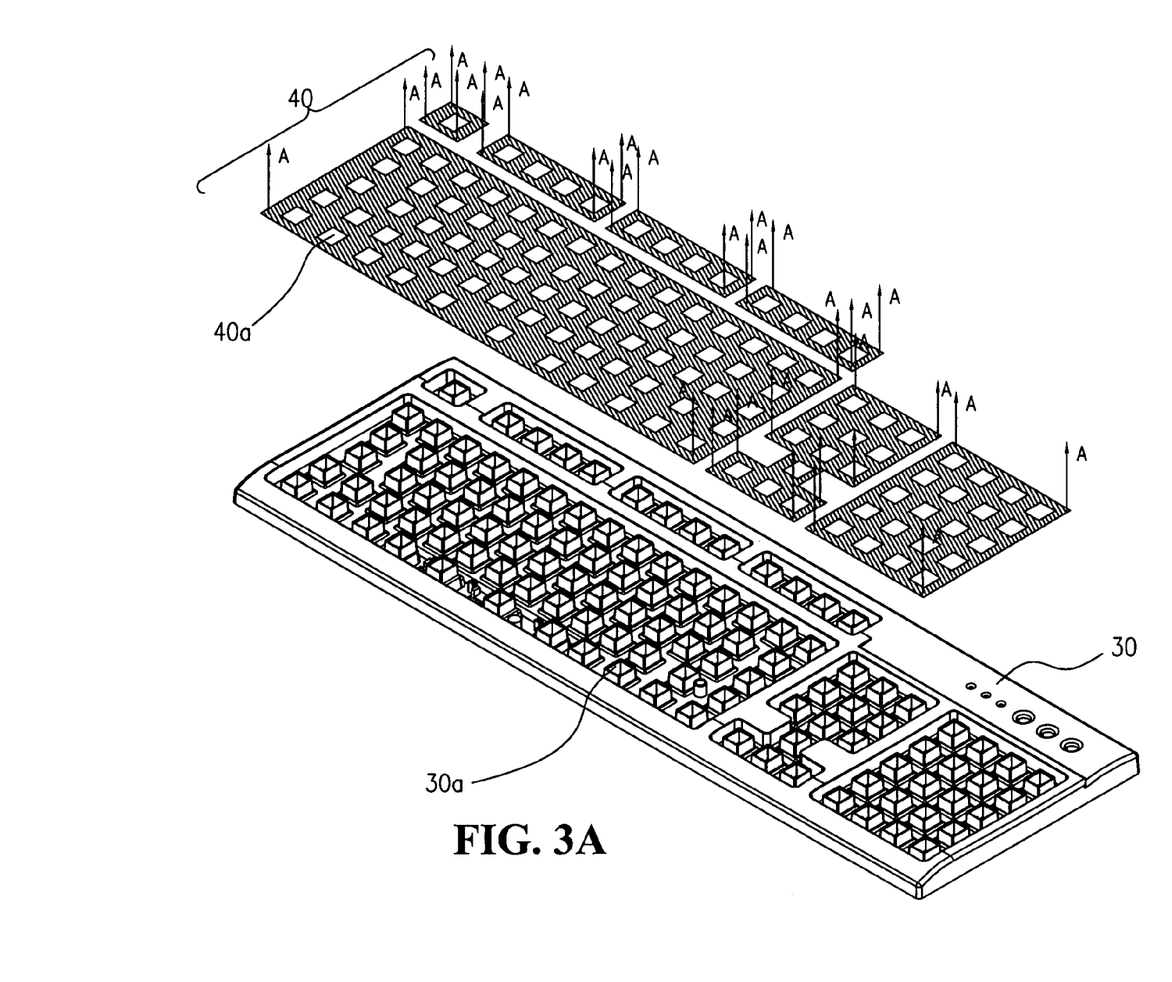
FIG. 3A is a perspective view of a fluorescent plate of the present invention applied with fluorescent ink.
Figure 3B:
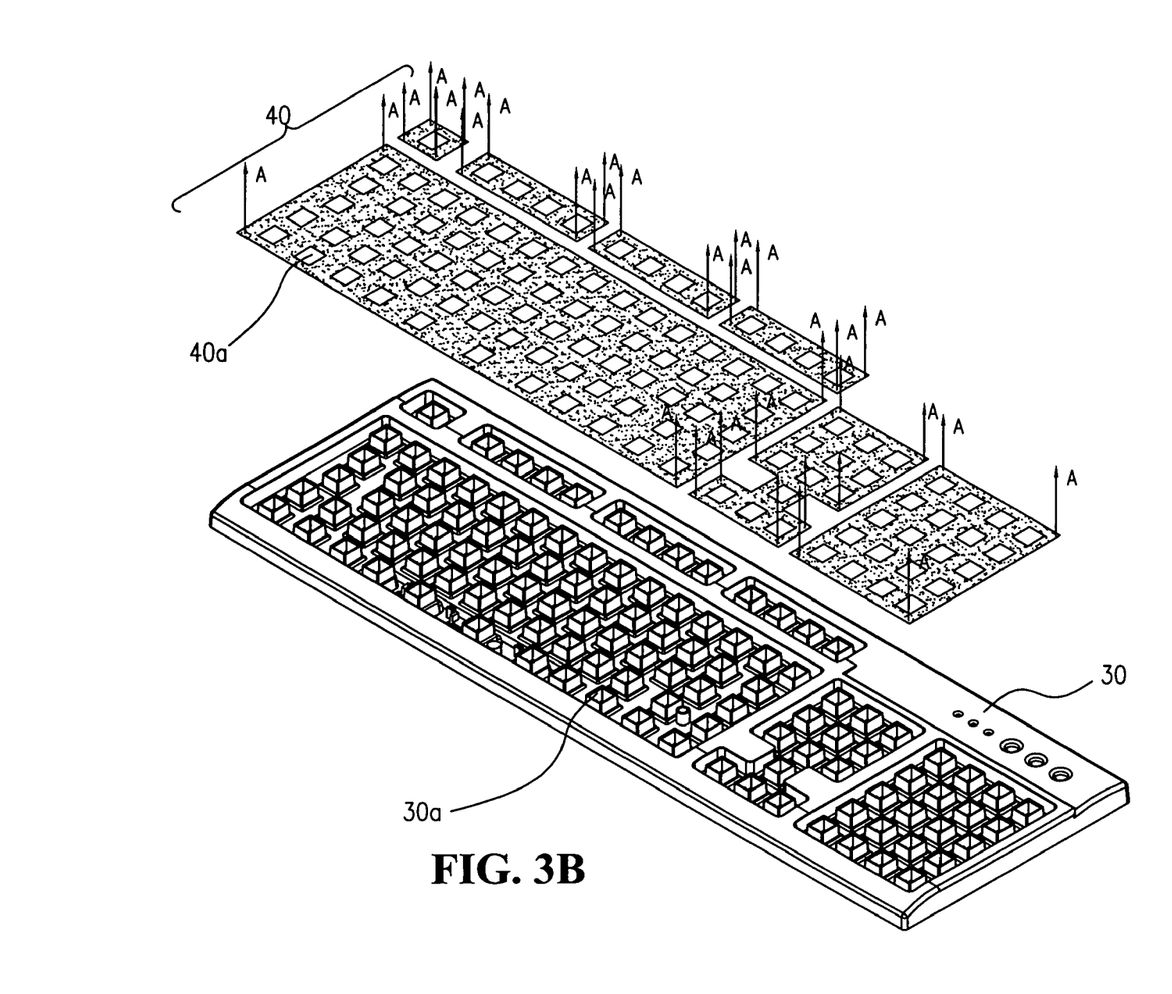
FIG. 3B is a perspective view of a fluorescent plate of the present invention added with fluorescent material.

The third embodiment of the present invention is an illuminated keyboard, the position on which the fluorescent light emits from the keyboard can be chosen on an additional fluorescent plate 40 with fluorescent material therein, the fluorescent plate 40 has thereon a plurality of hole regions 40a in corresponding by position respectively to a plurality of hole regions 30a for keys; in assembling the keyboard of the present invention, the fluorescent plate 40 is placed on the upper cover 30. The fluorescent plate 40 of the present invention can have its surface contacting with the upper cover 30 applied with fluorescent ink, please refer to FIG. 3 A which shows the fluorescent plate 40 of the present invention applied with fluorescent ink. And more, the fluorescent plate 40 can be made of some material mixed with fluorescent material therein, please refer to FIG. 3 B which shows the fluorescent plate 40 of the present invention mixed with fluorescent material therein. By virtue that the fluorescent plate 40 both have fluorescent material therein, the fluorescent plate 40 will emit fluorescent light by taking advantage of the environment of brightness of fluorescence of a screen of a monitor without any extraordinary illuminating equipment, so that the entire keyboard of the present invention can obtain an effect of a fluorescent keyboard.

Figure 4:
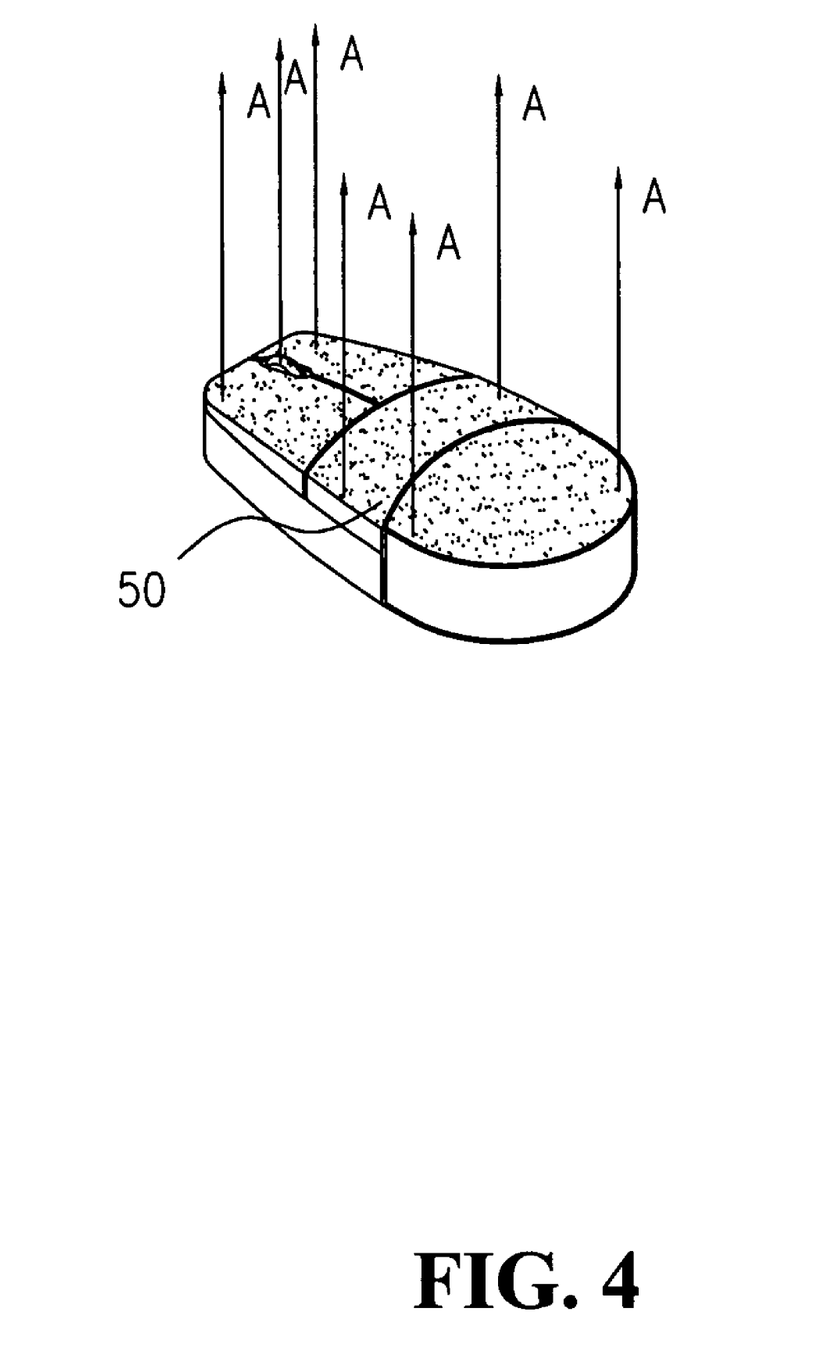
FIG. 4 is a perspective view of a mouse of the present invention with a housing having fluorescent material therein.

FIG. 4 depicts a mouse of the present invention with a housing 50 having fluorescent material therein, the housing 50 of the mouse of FIG. 4 has fluorescent material therein and thereby can emit fluorescent light A under the environment of brightness of fluorescence of a screen of a monitor, so that the mouse can obtain an effect of a fluorescent mouse. The fluorescent material added and mixed in the housing 50 can be added only to the pressing areas including the left push button, the right push button and the middle push button, in this way, the mouse of the present invention can get fluorescent effects at these push buttons. The fluorescent material added and mixed in the housing 50 can also be added to the entire housing 50, thereby an effect of shining mouse can be obtained under the environment of brightness of fluorescence of the screen of the monitor.

Whether the illuminated human-machine interface device of the present invention is a keyboard or a mouse, the fluorescent material therein is preferably fluorescent material capable of being effective for use for a long time such that fluorescence can exist to emit for a long time, thereby the illuminated human-machine interface device can be more sustained for operation in an environment of using same as that stated before.

In addition to that the illuminated human-machine interface device of the present invention needs no extraordinary illuminating equipment, but it (especially when it is a keyboard) directly takes advantage of the brightness of a screen of a monitor to afford operation of the illuminated human-machine interface device; the illuminated human-machine interface device of the present invention can similarly work under an environment lack of illuminating equipment or provided with no illuminating equipment.

It will be apparent to those skilled in this art that various equivalent modifications or changes can be made to the elements of the present invention without departing from the spirit and conception of this invention. Accordingly, all such equivalent modifications and changes shall fall within the scope of the appended claims.

What is claimed is:

1. An illuminated human-machine interface device, said illuminated human-machine interface device is a keyboard, said keyboard comprising: a plurality of key caps each having a fluorescent portion covered by a layer of fluorescent ink thereon and a transparent portion defining a light transmissive barrier between inner and outer sides of one said key cap, one of said fluorescent and transparent portions forming a symbol on each of said key caps, said key caps each being partially illuminated by emission of light from said fluorescent ink responsive to impingement thereon by a light emission from a computer monitor.

2. The illuminated human-machine interface device as in claim 1, wherein said printed symbols are formed by said transparent portion, said fluorescent extending about to define said transparent layer.

3. The illuminated human-machine interface device as in claim 1, wherein said key caps are made of transparent plastic added with a fluorescent material.

4. An illuminated human-machine interface device, said illuminated human-machine interface device that is a keyboard, wherein said keyboard comprises: an upper cover having a fluorescent portion covered by a layer of fluorescent ink thereon and a transparent portion defining a light transmissive barrier between inner and outer sides of said upper cover, and one of said fluorescent and transparent portions forming a symbol on said upper cover, said upper cover being partially illuminated by emission of light from said fluorescent ink responsive to impingement thereon by a light emission from a computer monitor.

5. The illuminated human-machine interface device as in claim 4, wherein said printed symbols are formed by said transparent portion, said fluorescent extending about to define said transparent layer.

6. The illuminated human-machine interface device as in claim 4, wherein said upper cover is made of transparent plastic added with a fluorescent material.

7. An illuminated human-machine interface device, said illuminated human-machine interface device is a keyboard, said keyboard comprising:
   an upper cover with a plurality of hole regions for accommodating keys;
   a plurality of key caps respectively disposed in said hole regions of said upper cover, each said key cap having a transparent portion defining a light transmissive barrier between inner and outer sides of one said key cap; and
   a fluorescent plate having therein a fluorescent material, wherein said fluorescent plate has a plurality of hole regions thereon corresponding by position respectively to said hole regions for said keys, and said fluorescent plate is placed on said upper cover, wherein said fluorescent ink is coated on said fluorescent plate, so that said fluorescent ink is illuminated by emission of light from said fluorescent ink responsive to impingement thereon by a light emission from a computer monitor.

8. The illuminated human-machine interface device as in claim 7, wherein said fluorescent plate is made by material added and mixed with said fluorescent material.

* * * * *